United States Patent
Cao

(10) Patent No.: US 9,734,353 B2
(45) Date of Patent: Aug. 15, 2017

(54) TERMINAL AND METHOD FOR HIDING AND PROTECTING DATA INFORMATION

(71) Applicants: YULONG COMPUTER TELECOMMUNICATION SCIENTIFIC (SHENZHEN) CO., LTD., Guangdong (CN); DONGGUAN YULONG TELECOMMUNICATION TECH CO., LTD., Guangdong (CN)

(72) Inventor: Jian Cao, Guangdong (CN)

(73) Assignees: YULONG COMPUTER TELECOMMUNICATION SCEINTIFIC (SHENZHEN) CO., LTD., Guangdong (CN); DONGGUAN YULONG TELECOMMUNICATION TECH CO., LTD., Guangdong (CN)

(*) Notice: Subject to any disclaimer, the term of this patent is extended or adjusted under 35 U.S.C. 154(b) by 0 days.

(21) Appl. No.: 14/787,162

(22) PCT Filed: Apr. 27, 2013

(86) PCT No.: PCT/CN2013/074865
§ 371 (c)(1),
(2) Date: Oct. 26, 2015

(87) PCT Pub. No.: WO2014/172908
PCT Pub. Date: Oct. 30, 2014

(65) Prior Publication Data
US 2016/0110561 A1    Apr. 21, 2016

(51) Int. Cl.
*H04L 29/06* (2006.01)
*G06F 21/62* (2013.01)
(Continued)

(52) U.S. Cl.
CPC .... *G06F 21/6245* (2013.01); *G06F 17/30268* (2013.01); *G06F 21/31* (2013.01);
(Continued)

(58) Field of Classification Search
USPC .......................................................... 726/26
See application file for complete search history.

(56) References Cited

U.S. PATENT DOCUMENTS

2001/0033661 A1* 10/2001 Prokoski ............... H04L 9/3297
380/258
2003/0147099 A1* 8/2003 Heimendinger ... H04N 1/32101
358/462
(Continued)

FOREIGN PATENT DOCUMENTS

| CN | 101082912 A | 12/2007 |
|----|-------------|---------|
| CN | 101120358 A | 2/2008  |

(Continued)

OTHER PUBLICATIONS

European Search Report dated Oct. 24, 2016 received from International Application No. PCT/CN2013/074865.

(Continued)

*Primary Examiner* — Jason Lee
(74) *Attorney, Agent, or Firm* — Scully, Scott, Murphy & Presser, P.C.

(57) ABSTRACT

The present invention provides a terminal which includes an an information collection unit configured to acquire subsidiary information added to a current image by a user and collect authentication information relating to the user according to an information hiding command received by the current image, an information processing unit configured to execute the following steps: eliminating the subsidiary information on the current image, and embedding the subsidiary information and the authentication information into (Continued)

a file of the current image from which the subsidiary information is eliminated in a related manner, or eliminating a display identifier of the subsidiary information on the current image, and embedding the subsidiary information, the display identifier, and the authentication information into the file of the current image from which the display identifier is eliminated from in a related manner. The present invention further provides a method for hiding and protecting data information.

12 Claims, 11 Drawing Sheets

(51) Int. Cl.
  *G06F 17/30* (2006.01)
  *G06F 21/31* (2013.01)
  *H04N 1/32* (2006.01)
  *H04W 12/02* (2009.01)
  *H04W 12/06* (2009.01)

(52) U.S. Cl.
  CPC ..... *G06F 21/6227* (2013.01); *H04N 1/32144* (2013.01); *H04W 12/02* (2013.01); *H04W 12/06* (2013.01)

(56) References Cited

U.S. PATENT DOCUMENTS

| | | | |
|---|---|---|---|
| 2005/0223315 A1* | 10/2005 | Shimizu | G06F 17/241 715/230 |
| 2006/0161578 A1 | 7/2006 | Siegel et al. | |
| 2008/0024828 A1 | 1/2008 | Isoda | |
| 2009/0204555 A1 | 8/2009 | Vashist et al. | |
| 2010/0205667 A1 | 8/2010 | Anderson et al. | |
| 2011/0039598 A1* | 2/2011 | Tang | H04N 5/772 455/556.1 |
| 2011/0179366 A1* | 7/2011 | Chae | G06F 21/84 715/764 |
| 2013/0091240 A1* | 4/2013 | Auger | G06F 17/241 709/217 |

FOREIGN PATENT DOCUMENTS

| | | |
|---|---|---|
| CN | 101815119 A | 8/2010 |
| CN | 101997969 A | 3/2011 |
| EP | 1 349 370 A2 | 10/2003 |
| EP | 1 914 961 A1 | 4/2008 |

OTHER PUBLICATIONS

International Search Report dated Feb. 20, 2014 received from International Application No. PCT/CN2013/074865.

* cited by examiner

TERMINAL AND METHOD FOR HIDING AND PROTECTING DATA INFORMATION

FIELD OF THE TECHNICAL

The present disclosure relates to terminal control technology field, and particularly, to a terminal and a method for hiding and protecting data information.

BACKGROUND

For intuition and convenience, a user often adds information next to an interested image object (e.g., face image, building, and so on). For example, the user adds a name, a work unit, a title, and a contact number next to a face image. However, the user often hopes that the annotation information on the image will not be looked up by others when a mobile phone of the user is lent to others, or will not be looked up by a person who picks up the mobile phone after the mobile phone is lost. The existing technology does not provide a better way to hide the annotation information on the image, thus user's privacy cannot be protected.

Therefore, the present invention provides a technical solution, which can conveniently and effectively hide and protect the subsidiary information on the image according to user's need, thus it is beneficial for protecting user's privacy, thereby avoiding being peeped by others.

SUMMARY

Based on the above-mentioned problems, the present invention provides a terminal for conveniently and effectively hiding and protecting subsidiary information of an image, which is beneficial for protecting user's privacy, thereby avoiding being peeped by others.

The present invention provides a terminal which includes an information collection unit configured to acquire subsidiary information added to a current image by a user and collect authentication information relating to the user according to an information hiding command received by the current image, an information processing unit configured to execute the following steps: eliminating the subsidiary information on the current image, and embedding the subsidiary information and the authentication information into a file of the current image from which the subsidiary information is eliminated in a related manner, or eliminating a display identifier of the subsidiary information on the current image, and embedding the subsidiary information, the display identifier, and the authentication information into the file of the current image from which the display identifier is eliminated from in a related manner.

In the technical solution, by hiding the subsidiary information or the display identifier of the subsidiary information on the image, the unauthenticated user can see the image itself, but cannot see the hidden information, and for the authenticated user, as the authentication information had been embedded, the hidden information can be obtained and displayed again by identifying the authentication information, enhancing information safety and protecting privacy of the authentication user. Wherein, there may be different subsidiary information types, and for different subsidiary information, it may need different processing modes due to its properties. For some text and graphic, they can be added to and displayed on the current image via handwriting input, keyboard input, or other. For these subsidiary information, a hiding operation can be directly exerted on these subsidiary information. However, for some audio file, video file, document, and so on, they cannot be directly displayed on the current image, and a corresponding display identifier needs to be added to the current image. When the user clicks the display identifier, the corresponding subsidiary information is called and displayed/played. For these subsidiary information, a hiding operation is exerted on the corresponding display identifier. Certainly, which display mode should be adopted can be set by the user according to actual condition, and then a corresponding processing mode is adopted according to the setting.

In the technical solution, preferably, the terminal further includes an information coding unit configured to encode the data information which needs to be embedded into the file into a digital watermark. The digital watermark is embedded into the file by the information processing unit in a related manner.

In the technical solution, by encoding the data information which needs to be embedded into the file into the digital watermark, the safety of the data information can be ensured and the fault detection rate can be decreased, thus the integrity and accuracy of the data information can be ensured.

In the technical solution, preferably, the information collection unit is further configured to obtain the subsidiary information or the position information of the display identifier on the current image. The information processing unit is further configured to embed the position information and the subsidiary information, or embed the position information and the display identifier into the file in a related manner.

In the technical solution, by obtaining the position information of the subsidiary information on the current image or obtaining the position information of the display identifier on the current image, when the subsidiary information or the display identifier is displayed again, the display position on the image is the position where the subsidiary information or the display identifier stays before the subsidiary information or the display identifier is eliminated. For doing so, when there are a number of heads in the image and the subsidiary information is the information of names each next to one head, each subsidiary information can correspond to one figure on the image again by returning the subsidiary information to its original position, to facilitate the user to look up the subsidiary information.

In the technical solution, preferably, the information collection unit is further configured to collect the real-time authentication information of the current operator according to an information activation command received by the specified image. The terminal further includes an information matching unit configured to obtain the authentication information embedded into the file of the specified image, and determine whether or not the authentication information matches the real-time authentication information. Wherein, when the authentication information matches the real-time authentication information, the information processing unit executes the following steps: obtaining the subsidiary information embedded into the file of the specified image, and displaying the subsidiary information on the specified image; or obtaining the subsidiary information and the corresponding display identifier embedded into the file of the specified image, and displaying the display identifier on the specified image.

In the technical solution, by obtaining the subsidiary information embedded into the image file, the original image can be completely restored. By comparing the authentication information with the real-time authentication information, it can ensure that the user who had performed the operation of hiding the subsidiary information of the specified image and the user who is looking up the subsidiary information of the specified image at current time are the same person, or the user who is looking up the subsidiary information of the specified image at current time is at least the other user authenticated by the user who had performed the operation of hiding the subsidiary information, to prevent disclosure of the subsidiary information of the image.

In the technical solution, preferably, the terminal further includes an information opening unit configured to open the subsidiary information corresponding to the display identifier according to a detection of a touch operation exerted on the display identifier when the display identifier is displayed on the specified image.

In the technical solution, by adding the display identifier, automatic open of the subsidiary information can be avoided when the authentication information matches the real-time authentication information, which is beneficial for the user to control the time of opening the subsidiary information, to make the operation be more human, and which is further beneficial for enhancing the usage safety of the subsidiary information and for protecting user's privacy.

In the technical solution, preferably, the terminal further includes an information decoding unit configured to obtain the digital watermark embedded into the file of the specified image if the authentication information and the subsidiary information, or if the authentication information, the subsidiary information, and the display identifier are all embedded into the file of the specified image in a digital watermarking method, and decode the digital watermark to obtain the corresponding information.

In the technical solution, for the condition that the authentication information and the subsidiary information, or the condition that the authentication information, the subsidiary information, and the display identifier are all embedded into the file of the specified image, by decoding the digital watermark, the authentication information obtained from the digital watermark is compared with the real-time authentication information. If there is a match, the subsidiary information or/and the display identifier are restored. By adopting the digital watermarking method, the difficulty of cracking the image by brute force attach to obtain the embedded subsidiary information increases, which is beneficial for enhancing the safety of the subsidiary information.

In the technical solution, preferably, the information collection unit is further configured to obtain the position information embedded into the file of the specified image. The terminal further includes an information display unit configured to display the subsidiary information or the display identifier on the specified image according to the position information.

In the technical solution, by obtaining the position information embedded into the file of the specified image, it can ensure that the display position of the subsidiary information or the display position of the display identifier is the display position where the subsidiary information or the display identifier stays before the subsidiary information or the display identifier is eliminated. If the subsidiary information or the display identifier is related to the image content, for example, if the subsidiary information or the display identifier is the explanation for the image content, it helps the user to understand the image content by way of position recovery.

In the technical solution, preferably, the subsidiary information collected by the information collection unit may include at least one or a combination of the following: a character, a graphic, a text, and a website link.

In the technical solution, the file includes at least one or a combination of the following: an audio file, a video file, an image file, a document, and an application. Wherein, for different types of the subsidiary information, if the subsidiary information can be directly displayed on the image, such as a characters, a graphic, a website link, and so on, the subsidiary information is directly displayed on the image, and if the subsidiary information cannot be directly displayed on the image, for example a document, the corresponding display identifier is displayed. Furthermore, if the subsidiary information is a document A, when the document A is added to the image, the document A can be directly embedded into the image file, and a display identifier linking to the document A is created on the image, thus the document A can be called when the corresponding display identifier is clicked by the user.

In the technical solution, preferably, the step of collecting the authentication information of the specified user by the information collection unit includes at least one or a combination of the following: collecting face information, fingerprint information, voice information, retina information of the specified user, and collecting the password input by the specified user.

The present invention further provides a method for hiding and protecting data information which includes: an information collection step for acquiring subsidiary information added to the current image by a user and collecting authentication information relating to the user according to an information hiding command received by the current image; an information processing step for eliminating the subsidiary information on the current image, and embedding the subsidiary information and the authentication information into a file of the current image from which the subsidiary information is eliminated in a related manner, or eliminating the display identifier of the subsidiary information on the current image, and embedding the subsidiary information, the display identifier, and the authentication information into a file of the current image from which the subsidiary information is eliminated in a related manner.

In the technical solution, by hiding the subsidiary information on the image or the display identifier of the subsidiary information, the unauthenticated user can see the image itself, but cannot see the hidden information, and for the authenticated user, as the authentication information had been embedded, the hidden information can be obtained and displayed again by identifying the authentication information, thereby enhancing information safety and protecting privacy of the authentication user. Wherein, there may be different subsidiary information types, and for different subsidiary information, it may need different processing modes due to its properties. For some text and graphic, they can be added to and displayed on the current image via handwriting input, keyboard input, or other. For these subsidiary information, a hiding operation can be directly exerted on these subsidiary information. However, for some audio file, video file, document, and so on, they cannot be directly displayed on the current image, and a corresponding display identifier needs to be added to the current image. When the user clicks the display identifier, the corresponding subsidiary information is called and displayed/played. For these subsidiary information, a hiding operation is exerted on the corresponding display identifier. Certainly, which display mode should be adopted can be set by the user according to actual condition, and then a corresponding processing mode is adopted according to the setting.

In the technical solution, preferably, the method further includes encoding the data information which needs to be embedded into the file into a digital watermark, and embedding the digital watermark into the file in a related manner.

In the technical solution, by encoding the data information which needs to be embedded into the file into a digital watermark, the safety of the data information can be ensured and the fault detection rate can be decreased, thus the integrity and accuracy of the data information can be ensured.

In the technical solution, preferably, the method further includes obtaining the subsidiary information or the position information of the display identifier on the current image, and embedding the position information and the subsidiary information or embedding the position information and the display identifier into the file in a related manner.

In the technical solution, by obtaining the position information of the subsidiary information or the position information of the display identifier on the current image, when the subsidiary information or the display identifier is displayed again, the display position on the image is the position where the subsidiary information or the display identifier stays before the subsidiary information or the display identifier is hidden. For doing so, when there are a number of heads in the image and the subsidiary information is the information of names each next to one head, each subsidiary information can correspond to one figure on the image again by returning the position of the subsidiary information to its original position, to facilitate the user to look up the subsidiary information.

In the technical solution, preferably, the method further includes the following: collecting the real-time authentication information of the current operator according to an information activation command received by the specified image; obtaining the authentication information embedded into the file of the specified image, and executing the following steps when the authentication information matches the real-time authentication information: obtaining the subsidiary information embedded into the file of the specified image, and displaying the subsidiary information on the specified image; or obtaining the subsidiary information and the corresponding display identifier embedded into the file of the specified image, and displaying the display identifier on the specified image.

In the technical solution, by obtaining the subsidiary information embedded into the image file, the original image can be completely restored. By comparing the authentication information with the real-time authentication information, it can ensure that the user who had performed the operation of hiding the subsidiary information of the specified image and the user who is looking up the subsidiary information of the specified image at current time are the same person, or the user who is looking up the subsidiary information of the specified image at current time is at least the other user authenticated by the user who had performed the operation of hiding the subsidiary information, to prevent disclosure of the subsidiary information of the image.

In the technical solution, preferably, when the display identifier is displayed on the specified image, the method further includes opening the subsidiary information corresponding to the display identifier according to a detection of a touch operation exerted on the display identifier.

In the technical solution, by adding the display identifier, automatic open of the subsidiary information can be avoided when the authentication information matches the real-time authentication information, which is beneficial for the user to control the time of opening the subsidiary information, to make the operation be more human, and which is also beneficial for enhancing the usage safety of the subsidiary information and protecting user's privacy.

In the technical solution, preferably, if the authentication information and the subsidiary information, or if the authentication information, the subsidiary information, and the display identifier are all embedded into the file of the specified image in a digital watermarking method, the method for obtaining the above-described information includes obtaining the digital watermark embedded into the file of the specified image, and decode the digital watermark to obtain the corresponding information.

In the technical solution, for the condition that the authentication information and the subsidiary information, or the condition that the authentication information, the subsidiary information, and the display identifier are all embedded into the file of the specified image, by decoding the digital watermark, the authentication information obtained from the digital watermark is compared with the real-time authentication information. If there is a match, the subsidiary information or/and the display identifier are restored. By adopting the digital watermarking method, the difficulty of cracking the image by brute force attach to obtain the embedded subsidiary information increases, which is beneficial for enhancing the safety of the subsidiary information.

In the technical solution, preferably, the method further includes obtaining the position information embedded into the file of the specified image, and displaying the subsidiary information or the display identifier on the specified image according to the position information.

In the technical solution, by obtaining the position information embedded into the file of the specified image, it can ensure that the display position of the subsidiary information or the display position of the display identifier is the display position where the subsidiary information or the display identifier stays before the subsidiary information or the display identifier is eliminated. If the subsidiary information or the display identifier is related to the image content, for example, if the subsidiary information or the display identifier is the explanation for the image content, it helps the user to understand the image content by way of position recovery.

In the technical solution, preferably, the subsidiary information may include at least one or a combination of the following: a character, a graphic, a text, and a website link.

In the technical solution, the file includes at least one or a combination of the following: an audio file, a video file, an image file, a document, and an application. Wherein, for different types of the subsidiary information, if the subsidiary information can be directly displayed on the image, such as a characters, a graphic, a website link, and so on, the subsidiary information is directly displayed on the image, and if the subsidiary information cannot be directly displayed on the image, for example a document, the corresponding display identifier is displayed. Furthermore, if the subsidiary information is a document A, when the document A is added to the image, the document A can be directly embedded into the image file, and a display identifier linking to the document A is created on the image, thus the document A can be called when the corresponding display identifier is clicked by the user.

In the technical solution, preferably, the step of collecting the authentication information of the specified user by the information collection unit includes at least one or a combination of the following: collecting face information, fingerprint information, voice information, retina information of the specified user, and collecting the password input by the specified user.

By way of the technical solution described above, the subsidiary information on an image can be conveniently and effectively hidden and protected according to user's need, which is beneficial for protecting user's privacy, thereby avoiding being peeped by others.

DETAILED DESCRIPTION OF ILLUSTRATED EMBODIMENTS

To understand the above-mentioned purposes, features and advantages of the present disclosure more clearly, the present disclosure will be further described in detail below in combination with the accompanying drawings and the specific implementations. It should be noted that, the embodiments of the present application and the features in the embodiments may be combined with one another without conflicts.

Many specific details will be described below for sufficiently understanding the present disclosure. However, the present disclosure may also be implemented by adopting other manners different from those described herein. Accordingly, the protection scope of the present invention is not limited by the specific embodiments disclosed below.

Figure 1:
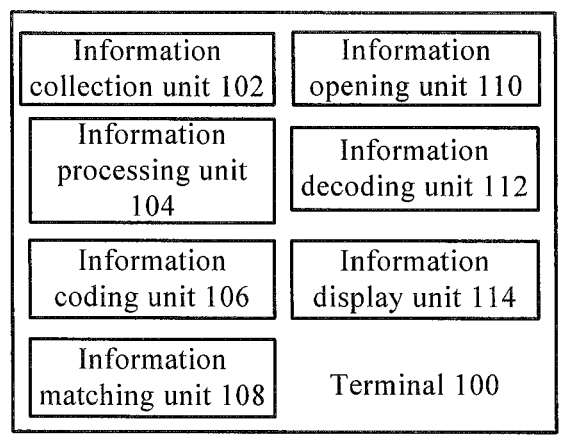
FIG. 1 is a block diagram of a terminal in accordance with an exemplary embodiment of the present invention.

FIG. 1 is a block diagram of a terminal in accordance with an exemplary embodiment of the present invention.

As shown in FIG. 1, a terminal 100 in accordance with an exemplary embodiment of the present invention includes an information collection unit 102 configured to acquire subsidiary information added to a current image by a user and collect authentication information relating to the user according to an information hiding command received by the current image, an information processing unit 104 configured to execute the following steps: eliminating the subsidiary information on the current image, and embedding the subsidiary information and the authentication information into a file of the current image from which the subsidiary information is eliminated in a related manner, or eliminating a display identifier of the subsidiary information on the current image, and embedding the subsidiary information, the display identifier, and the authentication information into the file of the current image from which the display identifier is eliminated from in a related manner.

In the technical solution, by hiding the subsidiary information or the display identifier of the subsidiary information on the image, the unauthenticated user can see the image itself, but cannot see the hidden information, and for the authenticated user, as the authentication information had been embedded, the hidden information can be obtained and displayed again by identifying the authentication information, enhancing information safety and protecting privacy of the authentication user. Wherein, there may be different subsidiary information types, and for different subsidiary information, it may need different processing modes due to its properties. For some text and graphic, they can be added to and displayed on the current image via handwriting input, keyboard input, or other. For these subsidiary information, a hiding operation can be directly exerted on these subsidiary information. However, for some audio file, video file, document, and so on, they cannot be directly displayed on the current image, and a corresponding display identifier needs to be added to the current image. When the user clicks the display identifier, the corresponding subsidiary information is called and displayed/played. For these subsidiary information, a hiding operation is exerted on the corresponding display identifier. Certainly, which display mode should be adopted can be set by the user according to actual condition, and then a corresponding processing mode is adopted according to the setting.

In the technical solution, preferably, the terminal 100 further includes an information coding unit 106 configured to encode the data information which needs to be embedded into the file into a digital watermark. The digital watermark is embedded into the file by the information processing unit 104 in a related manner.

In the technical solution, by encoding the data information which needs to be embedded into the file into a digital watermark, the safety of the data information can be ensured and the fault detection rate can be decreased, thus the integrity and accuracy of the data information can be ensured.

In the technical solution, preferably, the information collection unit 102 is further configured to obtain the subsidiary information or the position information of the display identifier on the current image. The information processing unit is further configured to embed the position information and the subsidiary information, or embed the position information and the display identifier into the file in a related manner.

In the technical solution, by obtaining the position information of the subsidiary information on the current image or obtaining the position information of the display identifier on the current image, when the subsidiary information or the display identifier is displayed again, the display position on the image is the position where the subsidiary information or the display identifier stays before the subsidiary information or the display identifier is eliminated. For doing so, when there are a number of heads in the image and the subsidiary information is the information of names each next to one head, each subsidiary information can correspond to one figure on the image again by returning the subsidiary information to its original position, to facilitate the user to look up the subsidiary information.

In the technical solution, preferably, the information collection unit 102 is further configured to collect the real-time authentication information of the current operator according to an information activation command received by the specified image. The terminal further includes an information matching unit 108 configured to obtain the authentication information embedded into the file of the specified image, and determine whether or not the authentication information matches the real-time authentication information. Wherein, when the authentication information matches the real-time authentication information, the information processing unit executes the following steps: obtaining the subsidiary information embedded into the file of the specified image, and displaying the subsidiary information on the specified image; or obtaining the subsidiary information and the corresponding display identifier embedded into the file of the specified image, and displaying the display identifier on the specified image.

In the technical solution, by obtaining the subsidiary information embedded into the image file, the original image can be completely restored. By comparing the authentication information with the real-time authentication information, it can ensure that the user who had performed the operation of hiding the subsidiary information of the specified image and the user who is looking up the subsidiary information of the specified image at current time are the same person, or the user who is looking up the subsidiary information of the specified image at current time is at least the other user authenticated by the user who had performed the operation of hiding the subsidiary information, to prevent disclosure of the subsidiary information of the image.

In the technical solution, preferably, the terminal 100 further includes an information opening unit 110 configured to open the subsidiary information corresponding to the display identifier according to a detection of a touch operation exerted on the display identifier when the display identifier is displayed on the specified image.

In the technical solution, by adding the display identifier, automatic open of the subsidiary information can be avoided when the authentication information matches the real-time authentication information, which is beneficial for the user to control the time of opening the subsidiary information, to make the operation be more human, and which is further beneficial for enhancing the usage safety of the subsidiary information and protecting user's privacy.

In the technical solution, preferably, the terminal 100 further includes an information decoding unit 112 configured to obtain the digital watermark embedded into the file of the specified image if the authentication information and the subsidiary information, or if the authentication information, the subsidiary information, and the display identifier are all embedded into the file of the specified image in a digital watermarking method, and decode the digital watermark to obtain the corresponding information.

In the technical solution, for the condition that the authentication information and the subsidiary information, or the condition that the authentication information, the subsidiary information, and the display identifier are all embedded into the file of the specified image, by decoding the digital watermark, the authentication information obtained from the digital watermark is compared with the real-time authentication information. If there is a match, the subsidiary information or/and the display identifier are restored. By adopting the digital watermarking method, the difficulty of cracking the image by brute force attach to obtain the embedded subsidiary information increases, which is beneficial for enhancing the safety of the subsidiary information.

In the technical solution, preferably, the information collection unit 102 is further configured to obtain the position information embedded into the file of the specified image. The terminal further includes an information display unit 114 configured to display the subsidiary information or the display identifier on the specified image according to the position information.

In the technical solution, by obtaining the position information embedded into the file of the specified image, it can ensure that the display position of the subsidiary information or the display position of the display identifier is the display position where the subsidiary information or the display identifier stays before the subsidiary information or the display identifier is eliminated. If the subsidiary information or the display identifier is related to the image content, for example, if the subsidiary information or the display identifier is the explanation for the image content, it helps the user to understand the image content by way of position recovery.

In the technical solution, preferably, the subsidiary information collected by the information collection unit may include at least one or a combination of the following: a character, a graphic, a text, and a website link.

In the technical solution, the file includes at least one or a combination of the following: an audio file, a video file, an image file, a document, and an application. Wherein, for different types of the subsidiary information, if the subsidiary information can be directly displayed on the image, such as a characters, a graphic, a website link, and so on, the subsidiary information is directly displayed on the image, and if the subsidiary information cannot be directly displayed on the image, for example a document, the corresponding display identifier is displayed. Furthermore, if the subsidiary information is a document A, when the document A is added to the image, the document A can be directly embedded into the image file, and a display identifier linking to the document A is created on the image, thus the document A can be called when the corresponding display identifier is clicked by the user.

In the technical solution, preferably, the step of collecting the authentication information of the specified user by the information collection unit includes at least one or a combination of the following: collecting face information, fingerprint information, voice information, retina information of the specified user, and collecting the password input by the specified user.

Figure 2A:
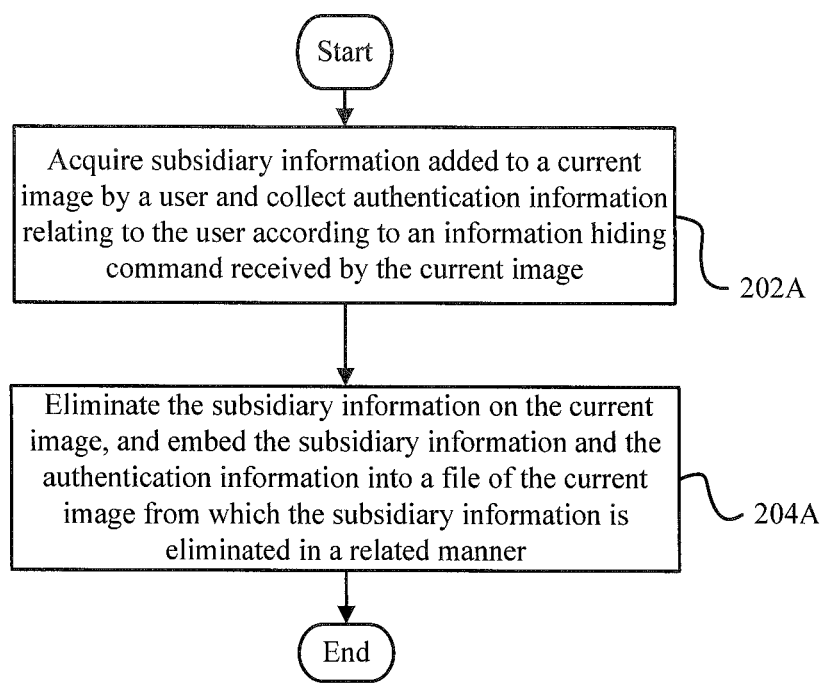
FIG. 2A is a flow chart of a method for hiding and protecting data information in accordance with an embodiment of the present invention.

FIG. 2A is a flow chart of a method for hiding and protecting data information in accordance with an exemplary embodiment of the present invention.

As shown in FIG. 2A, a method for hiding and protecting data information in accordance with an exemplary embodiment of the present invention includes the following: step 202A (information collection step), acquiring subsidiary information added to the current image by a user and collecting authentication information relating to the user according to an information hiding command received by the current image; step 204A (information processing step), eliminating the subsidiary information on the current image, and embedding the subsidiary information and the authentication information into a file of the current image from which the subsidiary information is eliminated in a related manner.

Figure 2B:
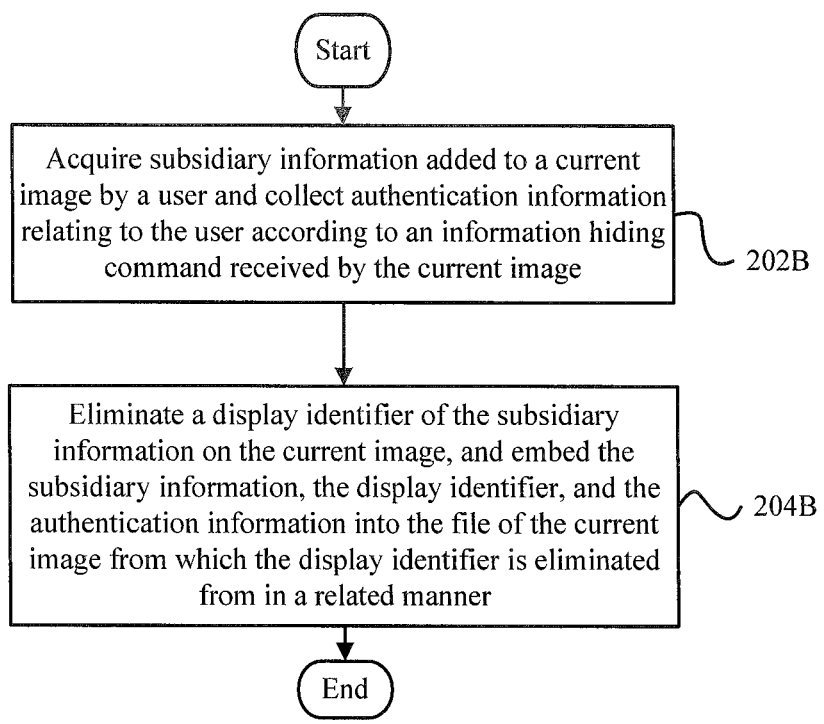
FIG. 2B is a flow chart of a method for hiding and protecting data information in accordance with another embodiment of the present invention.

Also, FIG. 2B shows a flow chart of a method for hiding and protecting data information in accordance with another embodiment of the present invention.

As shown in FIG. 2B, a method for hiding and protecting data information in accordance with another embodiment of the present invention includes the following: step 202B (information collection step), acquiring subsidiary information added to a current image by a user and collecting authentication information relating to the user according to an information hiding command received by the current image; step 204B (information processing step), eliminating the display identifier of the subsidiary information on the current image, and embedding the subsidiary information, the display identifier, and the authentication information into a file of the current image from which the subsidiary information is eliminated in a related manner.

In the technical solution shown in FIGS. 2A and 2B, by hiding the subsidiary information on the image or the display identifier of the subsidiary information, the unauthenticated user can see the image itself, but cannot see the hidden information, and for the authenticated user, as the authentication information had been embedded, the hidden information can be obtained and displayed again by identifying the authentication information, thereby enhancing information safety and protecting privacy of the authentication user. Wherein, there may be different subsidiary information types, and for different subsidiary information, it may need different processing modes due to its properties. For some text and graphic, they can be added to and displayed on the current image via handwriting input, keyboard input, or other. For these subsidiary information, a hiding operation can be directly exerted on these subsidiary information. However, for some audio file, video file, document, and so on, they cannot be directly displayed on the current image, and a corresponding display identifier needs to be added to the current image. When the user clicks the display identifier, the corresponding subsidiary information is called and displayed/played. For these subsidiary information, a hiding operation is exerted on the corresponding display identifier. Certainly, which display mode should be adopted can be set by the user according to actual condition, and then a corresponding processing mode is adopted according to the setting.

The following will describe further preferred embodiments in detail in accordance with the embodiments shown in FIG. 2A or FIG. 2B.

In the technical solution, preferably, the method further includes encoding the data information which needs to be embedded into the file into digital watermark, and and embedding the digital watermark into the file in a related manner.

In the technical solution, by encoding the data information which needs to be embedded into the file into a digital watermark, the safety of the data information can be ensured and the fault detection rate can be decreased, thus the integrity and accuracy of the data information can be ensured.

In the technical solution, preferably, the method further includes obtaining the subsidiary information or the position information of the display identifier on the current image, and embedding the position information and the subsidiary information or embedding the position information and the display identifier into the file in a related manner.

In the technical solution, by obtaining the position information of the subsidiary information or the position information of the display identifier on the current image, when the subsidiary information or the display identifier is displayed again, the display position on the image is the position where the subsidiary information or the display identifier stays before the subsidiary information or the display identifier is hidden. For doing so, when there are a number of heads in the image and the subsidiary information is the information of names each next to one head, each subsidiary information can correspond to one figure on the image again by returning the position of the subsidiary information to its original position, to facilitate the user to look up the subsidiary information.

In the technical solution, preferably, the method further includes the following: collecting the real-time authentication information of the current operator according to an information activation command received by the specified image; obtaining the authentication information embedded into the file of the specified image, and executing the following steps when the authentication information matches the real-time authentication information: obtaining the subsidiary information embedded into the file of the specified image, and displaying the subsidiary information on the specified image; or obtaining the subsidiary information and the corresponding display identifier embedded into the file of the specified image, and displaying the display identifier on the specified image.

In the technical solution, by obtaining the subsidiary information embedded into the image file, the original image can be completely restored. By comparing the authentication information with the real-time authentication information, it can ensure that the user who had performed the operation of hiding the subsidiary information of the specified image and the user who is looking up the subsidiary information of the specified image at current time are the same person, or the user who is looking up the subsidiary information of the specified image at current time is at least the other user authenticated by the user who had performed the operation of hiding the subsidiary information, to prevent disclosure of the subsidiary information of the image.

In the technical solution, preferably, when the display identifier is displayed on the specified image, the method further includes opening the subsidiary information corresponding to the display identifier according to a detection of a touch operation exerted on the display identifier.

In the technical solution, by adding the display identifier, automatic open of the subsidiary information can be avoided when the authentication information matches the real-time authentication information, which is beneficial for the user to control the time of opening the subsidiary information, to make the operation be more human, and which is also beneficial for enhancing the usage safety of the subsidiary information and protecting user's privacy.

In the technical solution, preferably, if the authentication information and the subsidiary information, or if the authentication information, the subsidiary information, and the display identifier are all embedded into the file of the specified image in a digital watermarking method, the method for obtaining the above-described information includes obtaining the digital watermark embedded into the file of the specified image, and decode the digital watermark to obtain the corresponding information.

In the technical solution, for the condition that the authentication information and the subsidiary information, or the condition that the authentication information, the subsidiary information, and the display identifier are all embedded into the file of the specified image, by decoding the digital watermark, the authentication information obtained from the digital watermark is compared with the real-time authentication information. If there is a match, the subsidiary information or/and the display identifier are restored. By adopting the digital watermarking method, the difficulty of cracking the image by brute force attach to obtain the embedded subsidiary information increases, which is beneficial for enhancing the safety of the subsidiary information.

In the technical solution, preferably, the method further includes obtaining the position information embedded into the file of the specified image, and displaying the subsidiary information or the display identifier on the specified image according to the position information.

In the technical solution, by obtaining the position information embedded into the file of the specified image, it can ensure that the display position of the subsidiary information or the display position of the display identifier is the display position where the subsidiary information or the display identifier stays before the subsidiary information or the display identifier is eliminated. If the subsidiary information or the display identifier is related to the image content, for example, if the subsidiary information or the display identifier is the explanation for the image content, it helps the user to understand the image content by way of position recovery.

In the technical solution, preferably, the subsidiary information may include at least one or a combination of the following: a character, a graphic, a text, and a website link.

In the technical solution, the file includes at least one or a combination of the following: an audio file, a video file, an image file, a document, and an application. Wherein, for different types of the subsidiary information, if the subsidiary information can be directly displayed on the image, such as a characters, a graphic, a website link, and so on, the subsidiary information is directly displayed on the image, and if the subsidiary information cannot be directly displayed on the image, for example a document, the corresponding display identifier is displayed. Furthermore, if the subsidiary information is a document A, when the document A is added to the image, the document A can be directly embedded into the image file, and a display identifier linking to the document A is created on the image, thus the document A can be called when the corresponding display identifier is clicked by the user.

In the technical solution, preferably, the step of collecting the authentication information of the specified user by the information collection unit includes at least one or a combination of the following: collecting face information, fingerprint information, voice information, retina information of the specified user, and collecting the password input by the specified user.

Figure 3:
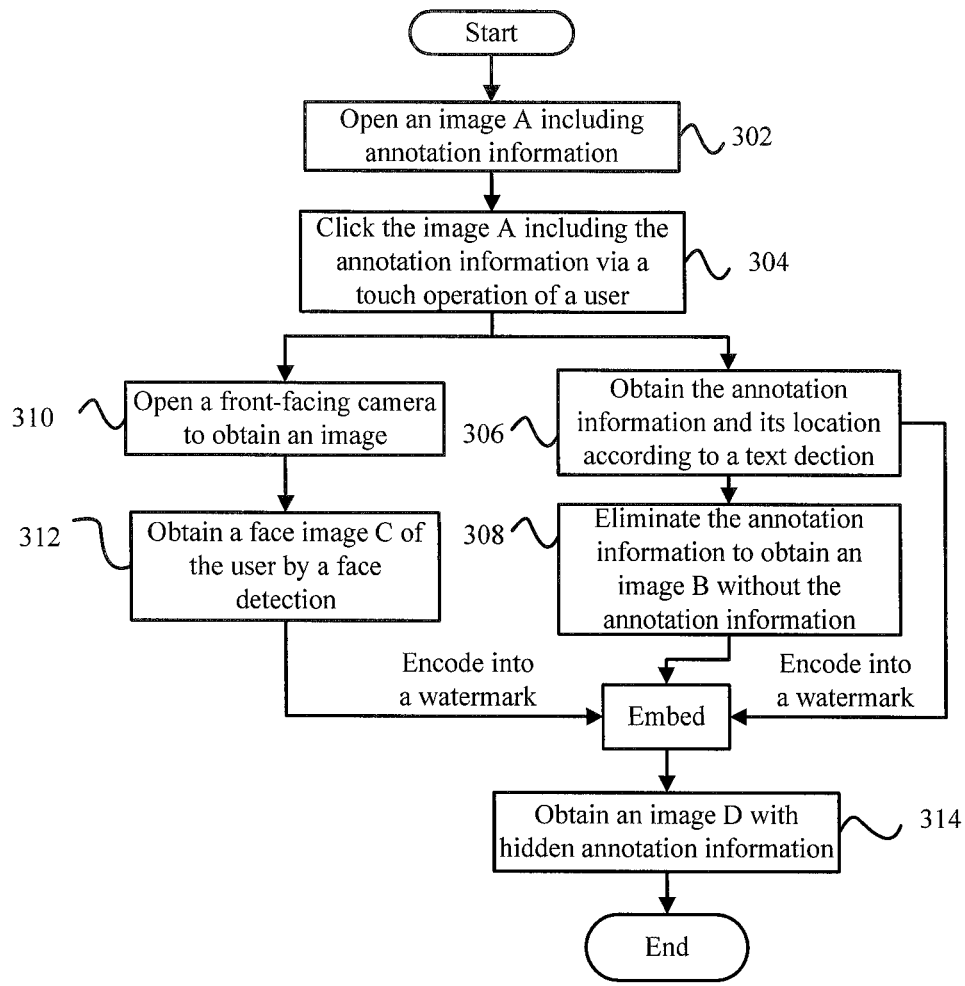
FIG. 3 is a detailed flow chart of a process for hiding annotation information in accordance with an exemplary embodiment of the present invention.

FIG. 3 is a detailed flow chart of a process for hiding annotation information in accordance with an exemplary embodiment of the present invention.

As shown in FIG. 3, the detailed process for hiding annotation information in accordance with an exemplary embodiment of the present invention includes the following.

In step 302, opening an image A including annotation information. In this embodiment, the annotation information is the text information. The information hiding command received by the image is a click exerted on the image via a touch operation of the user. The authentication information is the face image captured by a front-facing camera of the terminal.

In step 304, receiving the information hiding command by the image A when the user clicks the image A including the annotation information via a touch operation.

In step 306, acquiring the annotation information added to the image A by the user and the region where the annotation information stays by a text detection.

In step 308, eliminating the annotation information on the current image A to obtain the image B without the annotation information.

In step 310, opening the front-facing camera and collecting the authentication information relating to the user.

In step 312, obtaining the face image C of the user through a face detection.

In step 314, embedding the annotation information, the region where the annotation information stays, and the face image C into the image B in a watermarking method to obtain an image D with embedded watermark. The image D is the image the annotation of which had been hidden.

Figure 4:
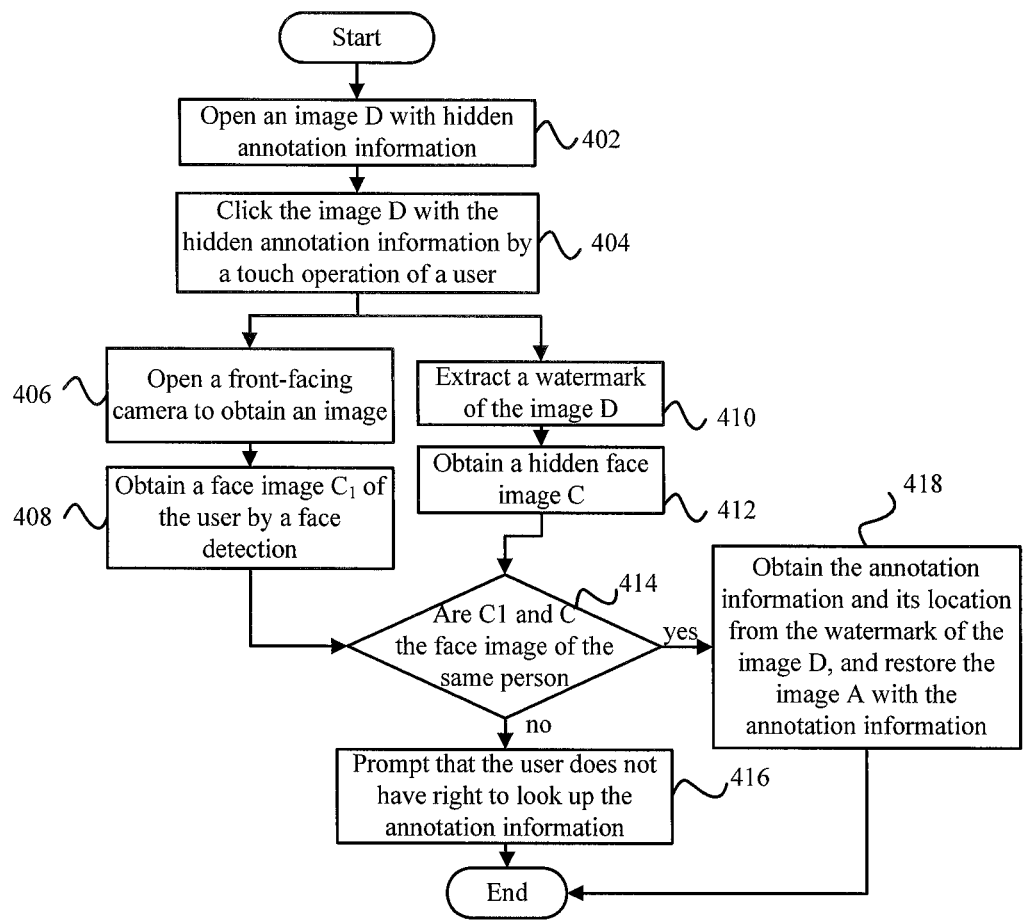
FIG. 4 is a detailed flow chart of a process for displaying annotation information in accordance with an exemplary embodiment of the present invention.

Corresponding to the embodiment shown in FIG. 3, FIG. 4 shows a detailed flow chart of a process for displaying annotation information in accordance with an exemplary embodiment of the present invention.

As shown in FIG. 4, the detailed process for displaying the annotation information in accordance with an exemplary embodiment of the present invention includes the following.

In step 402, opening the image D with hidden annotation information. In this embodiment, the annotation information is the text information. The information display command received by the image is a click exerted on the image via a touch operation of the user. The authentication information is the face image captured by a front-facing camera of the terminal.

In step 404, receiving the information display command by the image D when the user clicks the image D including the annotation information via a touch operation.

In step 406, opening the front-facing camera and obtaining the real-time authentication information.

In step 408, obtaining the face image $C_1$ of the user through a face detection, that is, the real-time authentication image.

In step 410, obtaining the digital watermark embedded into the image D, and decoding the digital watermark.

In step 412, obtaining the authentication image via the digital watermarking method, that is, the hidden face image C.

In step 414, determining whether or not the face image $C_1$ and the face image C are the face image of the same person. If not, step 416 is executed, otherwise step 418 is executed.

In step 416, prompting the user that the user does not have right to look up the annotation information of the image when it is determined that the face image $C_1$ and the face image C are not the face image of the same person.

In step 418, obtaining the annotation information and the location of the annotation information from the digital watermark information of the image D and restoring the image A including the annotation information when it is determined that the face image $C_1$ and the face image C are the face image of the same person.

In the embodiments shown in FIG. 3 and FIG. 4, as an example, the annotation information added to the image A is a text. For example, the annotation information is a contact next to some person in the image A. Certainly and obviously, information in other form can also be added to the image A, such as a graphic, an image, a link address, an so on, and the detailed process for the information in other form is the same as that for the annotation information in text form. Also, some files (audio files, video files, documents, and so on) can also be added to the image A. However, as these files cannot be directly displayed on the image A, a corresponding display identifier can be added to the image A. When the display identifier is clicked, the corresponding file is opened, and when a hiding or display operation is exerted on the file, the hiding or display operation is exerted on the display identifier.

The following will illustrate the technical solution of the present invention in detail in combination FIGS. 5A-5F. Wherein, FIGS. 5A-5F show schematic views of interfaces used in a method for hiding and protecting data information in accordance with an exemplary embodiment of the present invention.

Figure 5A:
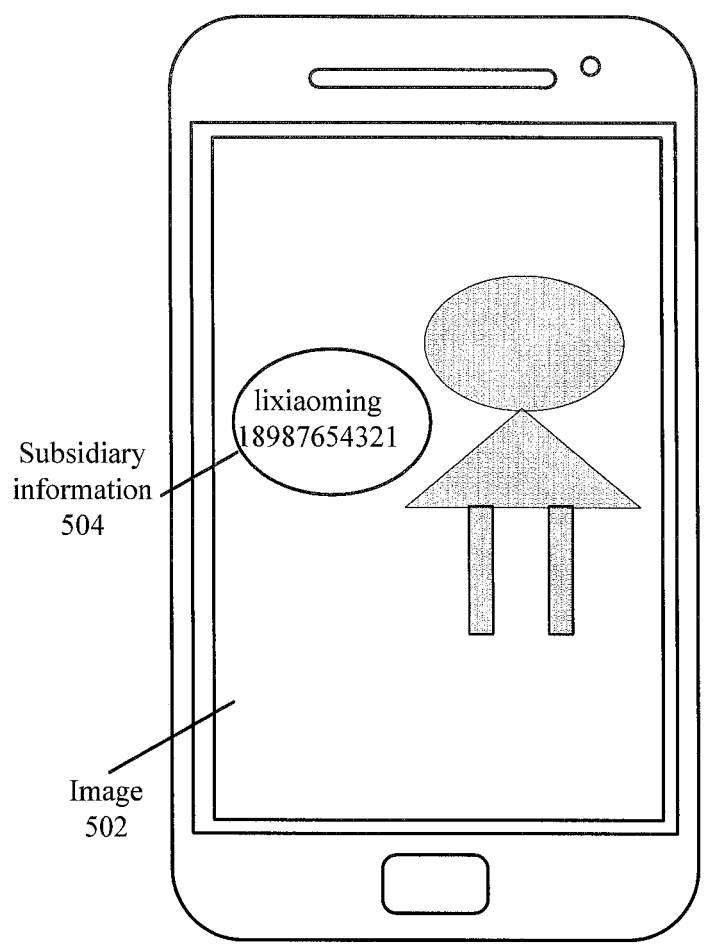
FIGS. 5A-5F are schematic views of interfaces used in a method for hiding and protecting data information in accordance with an exemplary embodiment of the present invention.

As shown in FIG. 5A, the user opens the image 502 through the terminal. Wherein, the information of "lixiaoming 18987654321" is the subsidiary information 504 of the image. The user needs to perform an operation to hide the annotation information, to avoid being looked up by other users.

Figure 5B:
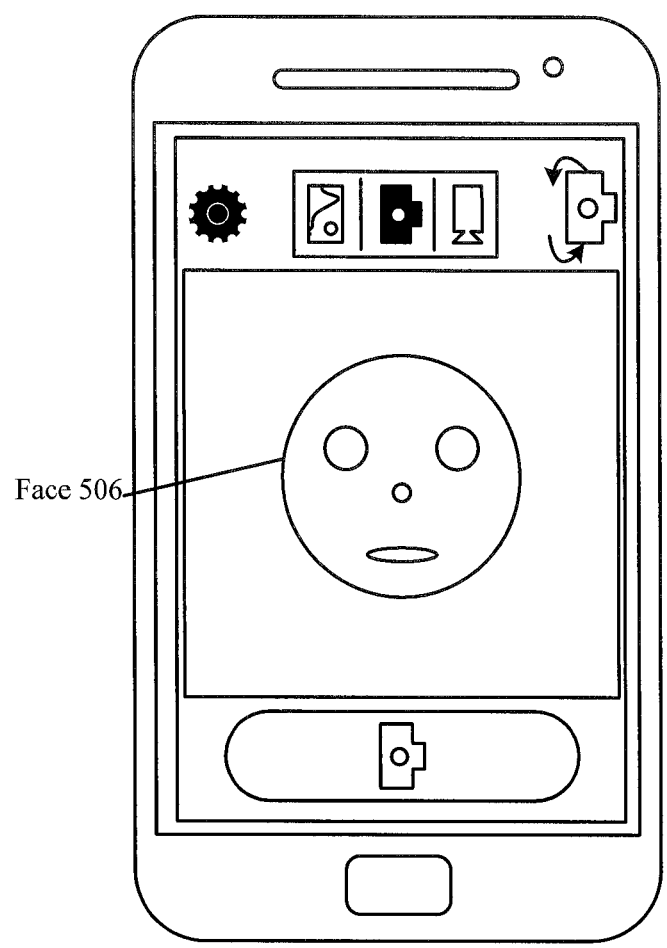

The user can perform a preset operation, for example, click the image 502 which needs to receive an information hiding operation via a touch operation, then the terminal receives the corresponding information hiding command. As shown in FIG. 5B, the front-facing camera is opened and the face image 506 is obtained through the face recognition detection.

Additionally, the terminal further eliminates the subsidiary information 504 from the image 502 to obtain the image without the subsidiary information 504 (not shown in the figure).

Figure 5C:
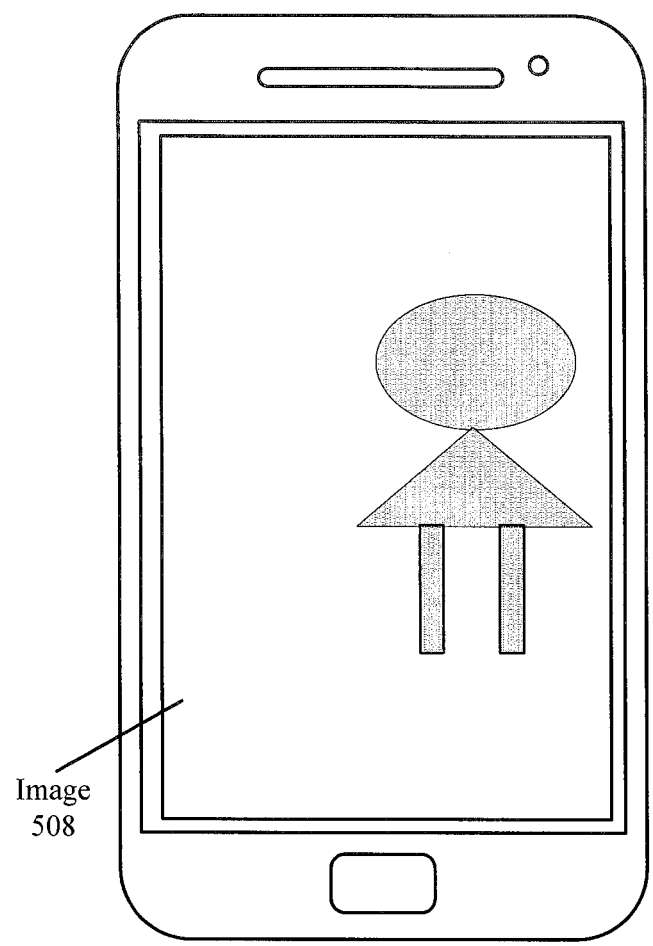

The subsidiary information 504 and the face image 506 are both embedded into the image without the subsidiary information 504 in a digital watermarking method and correspondingly, as shown in FIG. 5C, the image 508 including the hidden subsidiary information is obtained. For other users, as the image 508 can be still displayed in a normal method, the display of the image 508 will not raise the attention and doubt of other users.

Figure 5D:
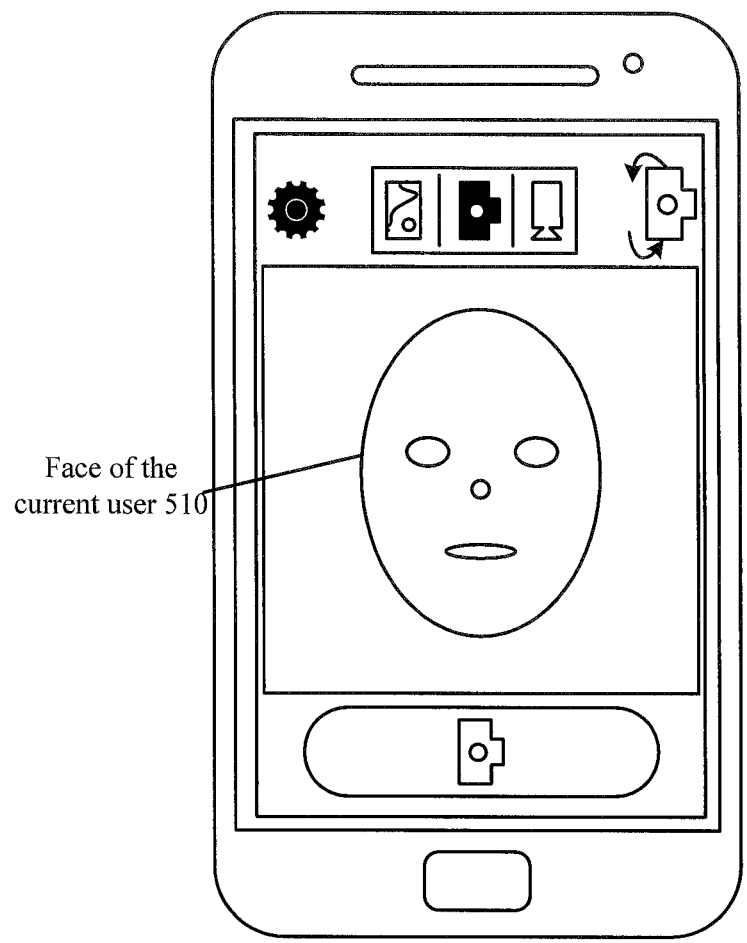

If the user wants to look up the hidden subsidiary information of the image 508, the user can click the image 508 via a touch operation, and the terminal correspondingly receives the information display command. As shown in FIG. 5D, the front-facing camera is opened, and the face image 510 of the current user which is used for real-time authentication can be obtained via a face detection. Also, the terminal extracts the digital watermark embedded into the image 508, and decodes the digital watermark to obtain the authentication image, that is, the hidden face image 506 shown in FIG. 5B.

Figure 5E:
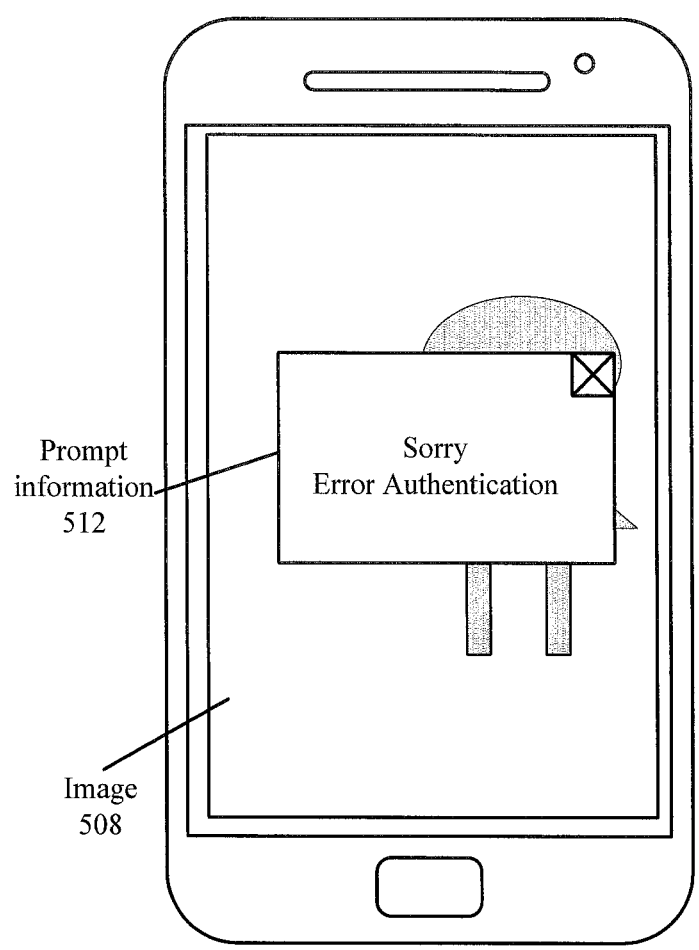

Whether or not the face image 506 and the face image 510 of the current user are the face image of the same person. If not, as shown in FIG. 5E, a prompt information 512 is displayed, to prompt that the user does not have right to look up the annotation information of the image.

If it is determined that the face image 506 and the face image 510 of the current user are the face image of the same person, the terminal obtains the subsidiary information 504 from the watermark of the image 508, and returns the current situation to the situation shown in FIG. 5A.

Certainly, if only the subsidiary information 504 is recorded, the current situation cannot be completely returned to the situation shown in FIG. 5A, and the subsidiary information may be displayed in a default method or randomly. Therefore, when there are a number of objects in the image, for example a number of persons which are unfamiliar to the user, it may be difficult for the user to determine the object corresponding to the subsidiary information 504. Therefore, the position information of the subsidiary information 504 on the image 502 can be recorded, and the position information 502, the subsidiary information 504, and the face image 506 are all embedded into the image without the subsidiary information 504 and correspondingly, after the digital watermark is extracted from the image 508 by the terminal, the subsidiary information 504 can be returned to its original position according to the digital watermark.

Figure 5F:
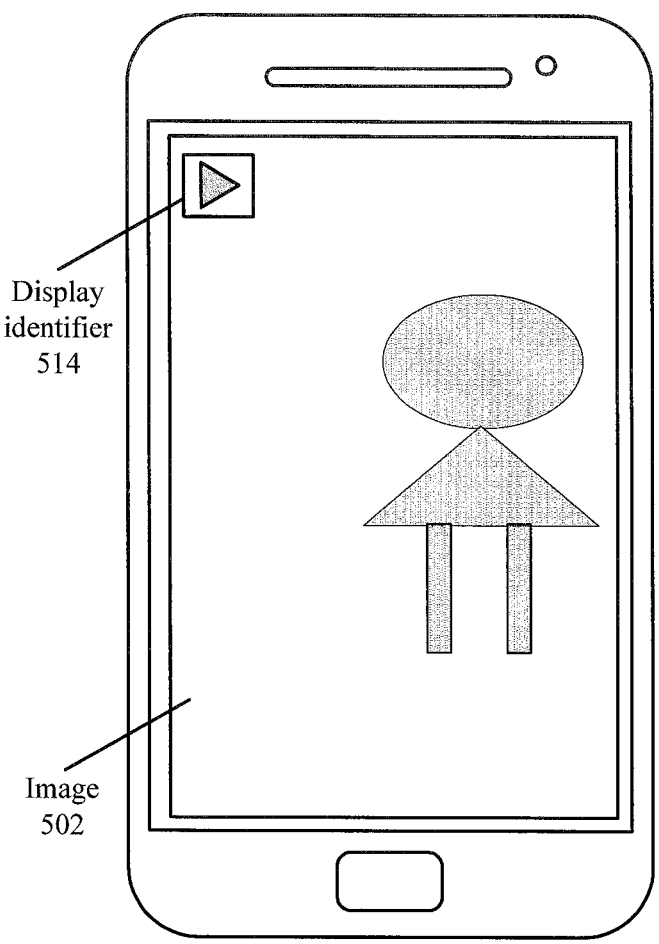

Additionally, as the subsidiary information 504 is a text, the subsidiary information 504 can be directly displayed on the image 502. However, for an audio file, a video file, an so on, they cannot be directly displayed on the image 502. As shown in FIG. 5F, when it needs to add a certain audio file to the image 502, on one hand, the audio file is embedded into the image 502, on the another hand, a corresponding display identifier 514 can be displayed on the image 502, thus the user can open the audio file via the display identifier 514.

Also, when the user wants to perform a similar hiding/display operation, the user can directly perform a hiding/display operation on the display identifier 514. The process for collecting the face image of the user and the process for embedding information are similar to the process described above, and will not be repeated herein.

The above illustrates the technical solution of the present invention in conjunction with the accompanying drawings. In the existing technology, the user selects to encrypt an image to prevent the subsidiary information of the image from being peeped by others. However, encryption and decryption need the user to remember and input a password, which is not beneficial for the user to perform an operation due to its complexity. Thus, the present invention provides a terminal and a method for hiding and protecting the data information. The present invention can hide and protect the subsidiary information in the image conveniently and effectively according to user's need, which is beneficial for protecting user's privacy, thereby avoiding being peeped by others.

The foregoing descriptions are merely preferred embodiments of the present disclosure, rather than limiting the present disclosure. Various modifications and alterations may be made to the present disclosure for those skilled in the art. Any modification, equivalent substitution, improvement or the like made within the spirit and principle of the present disclosure shall fall into the protection scope of the present disclosure.

What is claimed is:

1. A terminal comprising:
   a display configured to display an image having subsidiary information; and
   a processor comprising hardware configured to:
   collect real-time authentication information of a current operator according to an information activation command received by a specified image;
   acquire subsidiary information added to an image currently displayed on the display by a user and collect authentication information relating to the user in response to a command to hide the subsidiary information received for the image currently displayed, where the subsidiary information comprises at least one or a combination of the following: a character, a graphic, a text, and a website link;
   eliminate the subsidiary information on the image currently displayed, and embed the subsidiary information and the authentication information into a file of the image currently displayed from which the subsidiary information is eliminated in a related manner;
   or eliminate a display identifier of the subsidiary information on the image currently displayed, and embed the subsidiary information, the display identifier, and the authentication information into the file of the image currently displayed from which the display identifier is eliminated from in a related manner, where data information which needs to be embedded into the file is encoded into a digital watermark, which is embedded into the file in a related manner;
   obtain the authentication information embedded into the file of the specified image, and determine whether or not the authentication information matches the real-time authentication information; wherein, when the authentication information matches the real-time authentication information, the processor comprising hardware is further configured to obtain the subsidiary information embedded into the file of the specified image, and displaying the subsidiary information on the specified image;

or obtain the subsidiary information and the corresponding display identifier embedded into the file of the specified image, and display the display identifier on the specified image.

2. The terminal of claim 1, wherein the processor comprising hardware is further configured to obtain the position information of the display identifier on the image currently displayed or the position information of the subsidiary information; and embed the position information and the subsidiary information, or embed the position information and the display identifier into the file in a related manner.

3. The terminal of claim 1, wherein the processor comprising hardware is further configured to open the subsidiary information corresponding to the display identifier according to a detection of a touch operation exerted on the display identifier when the display identifier is displayed on the specified image.

4. The terminal of claim 1, wherein the processor comprising hardware is further configured to obtain the digital watermark embedded into the file of the specified image if the authentication information and the subsidiary information, or if the authentication information, the subsidiary information, and the display identifier are all embedded into the file of the specified image in a digital watermarking method, and decode the digital watermark to obtain the corresponding information.

5. The terminal of claim 1, wherein the processor comprising hardware is further configured to obtain the position information embedded into the file of the specified image; and the subsidiary information or the display identifier is displayed on the display on the specified image according to the position information.

6. The terminal of claim 1, wherein the authentication information of the user comprises at least one or a combination of the following: collecting face information, fingerprint information, voice information, retina information of the user, and collecting the password input by the user.

7. A method for hiding and protecting data information, comprising:

displaying an image having subsidiary information;

collecting a real-time authentication information of a current operator according to an information activation command received by a specified image;

acquiring subsidiary information added to an image currently displayed by a user and collecting authentication information relating to the user in response to a command for hiding the subsidiary information received for the image currently displayed;

eliminating the subsidiary information on the image currently displayed, and embedding the subsidiary information and the authentication information into a file of the image currently displayed from which the subsidiary information is eliminated in a related manner, the subsidiary information comprises at least one or a combination of the following: a character, a graphic, a text, and a website link, or eliminating the display identifier of the subsidiary information on the image currently displayed, and embedding the subsidiary information, the display identifier, and the authentication information into a file of the image currently displayed from which the subsidiary information is eliminated in a related manner, where data information which needs to be embedded into the file is encoded into a digital watermark, which is embedded into the file in a related manner;

obtaining the authentication information embedded into the file of the specified image, and when the authentication information matches the real-time authentication information, the method further comprises:

obtaining the subsidiary information embedded into the file of the specified image, and displaying the subsidiary information on the specified image;

or obtaining the subsidiary information and the corresponding display identifier embedded into the file of the specified image, and displaying the display identifier on the specified image.

8. The method for hiding and protecting data information of claim 7, wherein the method further comprises:

obtaining the position information of the display identifier on the image currently displayed or the position information of the subsidiary information on the image currently displayed, and embedding the position information and the subsidiary information or embedding the position information and the display identifier into the file in a related manner.

9. The method for hiding and protecting data information of claim 7, wherein when the display identifier is displayed on the specified image, the method further comprises:

opening the subsidiary information corresponding to the display identifier according to a detection of a touch operation exerted on the display identifier.

10. The method for hiding and protecting data information of claim 7, wherein if the authentication information and the subsidiary information, or if the authentication information, the subsidiary information, and the display identifier are all embedded into the file of the specified image in a digital watermarking method, the method for obtaining the information comprises obtaining the digital watermark embedded into the file of the specified image, and decode the digital watermark to obtain the corresponding information.

11. The method for hiding and protecting data information of claim 7, wherein the method further comprises:

obtaining the position information embedded into the file of the specified image;

displaying the subsidiary information or the display identifier on the specified image according to the position information.

12. The method for hiding and protecting data information of claim 7, wherein the authentication information of the user comprises at least one or a combination of the following: collecting face information, fingerprint information, voice information, retina information of the user, and collecting the password input by the user.

* * * * *